(12) United States Patent
Fino

(10) Patent No.: US 8,896,633 B2
(45) Date of Patent: Nov. 25, 2014

(54) ADJUSTING A DISPLAY SIZE OF TEXT

(75) Inventor: Jorge Fino, San Jose, CA (US)

(73) Assignee: Apple Inc., Cupertino, CA (US)

( * ) Notice: Subject to any disclaimer, the term of this patent is extended or adjusted under 35 U.S.C. 154(b) by 713 days.

(21) Appl. No.: 12/858,317

(22) Filed: Aug. 17, 2010

(65) Prior Publication Data
US 2012/0044267 A1 Feb. 23, 2012

(51) Int. Cl.
G09G 5/00 (2006.01)
G09G 5/24 (2006.01)

(52) U.S. Cl.
CPC ............... *G09G 5/24* (2013.01); *Y10S 715/978* (2013.01)
USPC ............ 345/661; 345/157; 715/978; 715/808

(58) Field of Classification Search
CPC .............. G06F 3/048; G06F 9/00; G09G 5/00
USPC ........... 345/157–160, 661; 715/978, 808–810
See application file for complete search history.

(56) References Cited

U.S. PATENT DOCUMENTS

| | | | |
|---|---|---|---|
| 6,466,203 B2 | 10/2002 | Van Ee | |
| 6,704,034 B1 * | 3/2004 | Rodriguez et al. | ............ 715/860 |
| 2006/0095846 A1 * | 5/2006 | Nurmi | ............................ 715/701 |
| 2007/0152984 A1 | 7/2007 | Ording et al. | |
| 2009/0109243 A1 | 4/2009 | Kraft et al. | |
| 2009/0199119 A1 * | 8/2009 | Park et al. | ....................... 715/765 |
| 2009/0313020 A1 * | 12/2009 | Koivunen | ...................... 704/260 |
| 2010/0079498 A1 | 4/2010 | Zaman et al. | |
| 2010/0283800 A1 * | 11/2010 | Cragun et al. | ................. 345/661 |

FOREIGN PATENT DOCUMENTS

FR 2794560 A1 12/2000

* cited by examiner

*Primary Examiner* — Ke Xiao
*Assistant Examiner* — Weiming He
(74) *Attorney, Agent, or Firm* — Schwegman Lundberg & Woessner, P.A.

(57) ABSTRACT

This is directed to adjusting the size of displayed text in response to receiving user instructions. An electronic device can display text or other content using one or more default sizes. A user can direct the device to increase a display size of text by providing a corresponding input. In response to receiving the instruction, the electronic device can increase the display size of the text and display the beginning of the text (e.g., the beginning of a sentence), even though an input may be detected in a region near the end of the text. In some cases, when the user instructs the device to increase the display size of text beyond a maximum level, the electronic device can provide an audio output corresponding to the text instead of or in addition to increasing the display size of the text.

8 Claims, 8 Drawing Sheets

ADJUSTING A DISPLAY SIZE OF TEXT

BACKGROUND

Many electronic devices include one or more displays on which information can be provided to a user. For example, graphics, images, videos, text, glyphs, or other content can be provided on a display. The content can be disposed on the display in any suitable manner including, for example, as distinct, non-overlapping content, or as content disposed on different overlapping layers. Different approaches can be used to determine the disposition, layout, size and other attributes of specific content on a display. In some cases, a user interface developer can define the manner in which content is displayed. For example, a developer can select a text font type, font size, text box dimensions, font color, or other display attributes for text provided in a user interface.

The particular display attributes used for displayed content can be selected to ensure that a user can adequately distinguish the content and interact with the device. For example, a font size can be selected to be at least a minimum amount required for a user with average or below average eyesight to be able to distinguish and consume displayed content. Some users of electronic devices, however, may have reduced eyesight or disabilities that make it difficult for the users to distinguish the content when displayed using the default or standard display attributes.

Some electronic devices can provide accessibility modes by which the manner in which content is provided to a user of the device is modified to assist users having difficulty consuming content provided in a default or standard manner. For example, some electronic devices can provide an audio output that reads one or more text elements provided in an interface, or an output that describes non-textual content provided on the display. As another example, some electronic devices can provide a zoomed interface by which the entirety of a user interface is zoomed to a particular level such that all of the content displayed within the interface is larger and easier to see. Because the interface is zoomed larger than the available display, a user can scroll or pan the zoomed in interface to view all of the available content provided using the device. In some embodiments, a user can in addition zoom in on an interface when the accessibility mode is not enabled (e.g., zoom in a portion of a web page in a region identified by the zooming instruction, for example the region in which a double tap touch instruction was received).

SUMMARY

This is directed to increasing the size of particular content, such as text, while displaying the content in a manner that ensures that a user can consume the particular content from the beginning of the content. In addition, this is directed to enabling an audio-based mode in response to receiving a request to zoom content beyond a maximum threshold.

In some embodiments, an electronic device can display text in a display region using an initial display size, where the text includes a beginning and an end (e.g., a first and last letter, or a first and last word). The electronic device can receive an instruction to increase a display size of the displayed text, where the instruction is provided by an input detected within the display region The electronic device can identify the beginning of the text, and display the text in the display region using an increased display size larger than the initial display size. When displayed using the increased display size, the electronic device can display less of the text, and can display at least the beginning of the text, for example independently of where the input was detected within the display region.

In some embodiments, a electronic device can display text using a first display size, such as a first font size or a first zoom level. The electronic device can receive, from an input interface, an instruction to display the text using a second display size larger than the first display size (e.g., using a larger font or a higher zoom level). The instruction can be detected in a region of the displayed text other than a region that includes a first character of the text. For example, the instruction can be detected in a region near the end of the text. The electronic device can then display at least the first character of the text using the second display size.

In some embodiments, an electronic device can display a text string that includes a beginning and an end. The electronic device can receive an instruction to increase a display size of the text string, where the instruction is detected in a region near the end of the text string. In particular, the instruction can be detected in a region that does not include the beginning of the text string. The electronic device can display a subset of the text string using an increased display size, where the subset of the text string includes the beginning of the text string but not the end of the text string.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

An electronic device can display any suitable content for a user. In some cases, the content can include text that a user can read. An electronic device can use any suitable component or circuitry to display text or other content.

Figure 1:
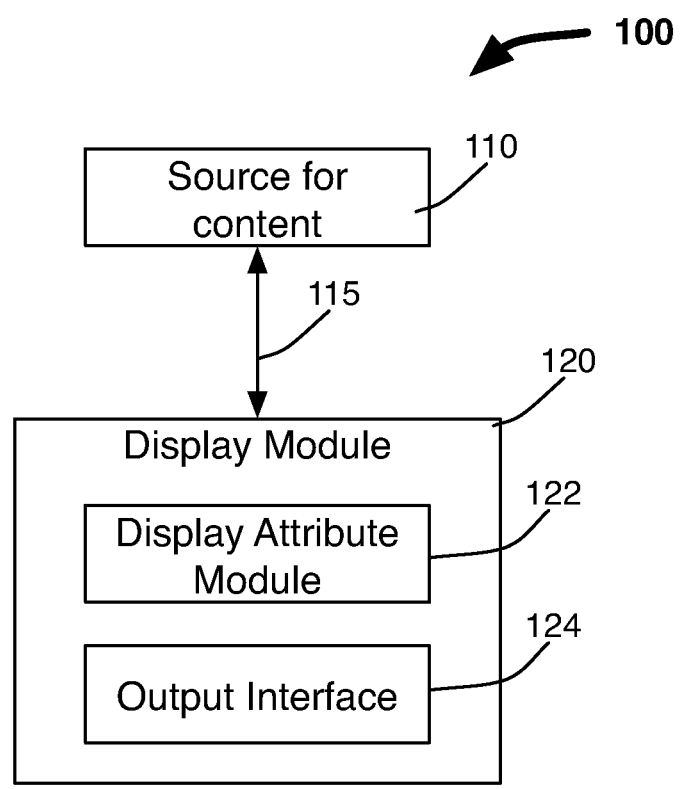
FIG. 1 is a schematic view of an illustrative system for displaying text in accordance with one embodiment of the invention.

FIG. 1 is a schematic view of an illustrative system for displaying text in accordance with one embodiment of the invention. System 100 can be integrated in any suitable electronic device or combination of electronic devices. For example, system 100 can be incorporated in a single electronic device. As another example, different features or functionality of system 100 can be distributed or replicated between several electronic devices (e.g., devices or components connected by a communications path). System 100 can include source 110 for content to be displayed. Source 110 can provide any suitable type of content for display by a device including, for example, content or information corresponding to an application operating on the device, a system task, an operating system, firmware, or other code or software defining a manner in which the device operates. The content can be provided in any suitable form including, for example, as images, video, text, or other higher-level information, as glyphs or other combinations of pixels, or other forms. In some embodiments, the content can include text or other particular information that a user can read.

Any suitable source 110 can provide content for display by a device. For example, source 110 can include one or more applications operating on the device, where the applications provide content with which a user can interact. The content can be provided as one or more display elements forming a user interface. As another example, source 110 can include an operating system that provides a platform on which applications can run, and an interface for interacting with applications. Each source can provide content using any suitable approach including, for example, in the manners described above.

Source 110 can provide content over communications path 115 to display module 120 for display by the electronic device. Communications path 115 can include any wired or wireless path by which instructions or content can be transferred between source 110 and display module 120. For example, communications path 115 can include a wire, flex circuit, conductive trace, or other physical path by which an electrical signal can be transmitted. As another example, communications path 115 can include a wireless path. The wireless communications path can support any suitable communications protocol, or any suitable type of communications network including, for example, Wi-Fi (e.g., a 802.11 protocol), Bluetooth™ (which is a trademark owned by Bluetooth Sig, Inc.), radio frequency systems, cellular networks, infrared, or combinations of these.

Upon receiving content to display from source 110, display module 120 can provide the received content to display attribute module 122. Display attribute module 122 can configure a layout for content received from source 110, and establish particular display attributes for items of content received from source 110. For example, display attribute module 122 can retrieve or define particular regions of a display in which content is to be provided, and define display attributes of the content that define the manner in which the content is displayed to ensure that the content is properly presented within the allocated region. When the content includes text, display attribute module 122 can define a font type, font size, spacing, orientation, alignment, or other display attributes of the text.

In some embodiments, the display attribute module can select particular display attributes or a particular layout for text (e.g., the size of a display region for text) based on a zoom level or text size instruction received from an input interface in communication with the display module. For example, the display attribute module can select a particular display size based on a previous display size, or a received instruction to increase or decrease a display size. Display attribute module 122 can provide display instructions directing output interface 124 to provide a visual output corresponding to the content provided by source 110 using the display attributes established by display attribute module 122.

In response to receiving a user instruction, or as an application operates, the particular content provided by display module 120 can change. Source 110 can then provide new content to display module 120, where display attributes of the new content can be defined to enable output interface 124 to display the new content. Although the following discussion will describe the displayed content as text, it will be understood that any type of content can be provided by the electronic device.

Figure 2:
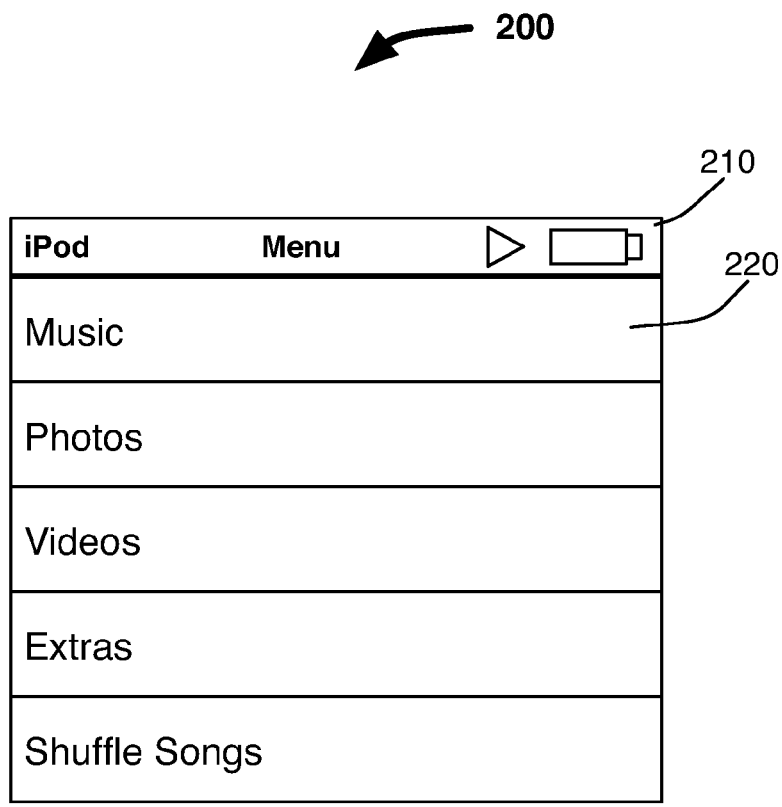
FIG. 2 is a schematic view of an illustrative device display in accordance with one embodiment of the invention.

The electronic device can provide any suitable interface. For example, the electronic device can provide an interface having several selectable text elements for directing the device to perform one or more operations. FIG. 2 is a schematic view of an illustrative device display in accordance with one embodiment of the invention. Display 200 can include title bar 210 and listings 220 of selectable options. Each of title bar 210 and listings 220 can include text, graphics, images, or other content displayed to a user. For example, title bar 210 can include text corresponding to the type of device (e.g., "iPod") and to the type of display (e.g., "menu"), and graphics corresponding to the playback status of the device and to the battery remaining for the device. Listings 220 can include any suitable option for directing the electronic device to perform an operation including, for example, listings of options for navigating a hierarchical menu, such as options corresponding to music metadata or music attributes (e.g., options for music, photos, videos, extras, and to shuffle songs).

The text displayed in each of title bar 210 and listings 220 can have any suitable display attribute, including for example a display attribute corresponding to the particular region in which the text is displayed. In particular, text displayed in title bar 210 can have a smaller font size than text displayed in listings 220. Other display attributes can be the same or different, such as a font type, text color, spacing between characters, shadowing, or combinations of these. In some embodiments, display attributes can be the same or different for individual text items within a particular region. For example, different text items in different listings 220 can have different display attributes (e.g., provide different text font sizes based on the length of the text within the listing). In some embodiments, each listing within listings 220 can be considered as a different display region.

Figure 3:
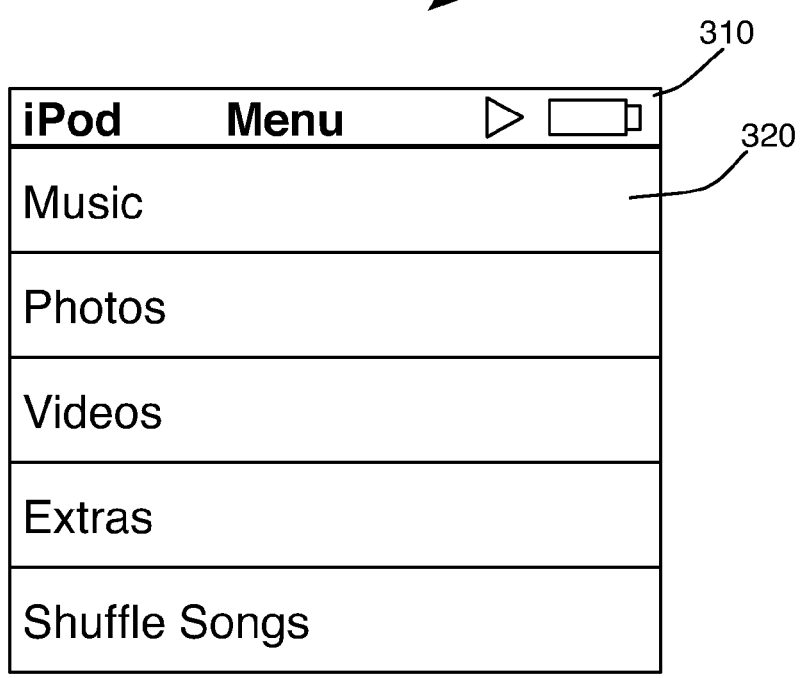
FIG. 3 is a schematic view of the illustrative device display of FIG. 2 in which text is displayed using different display attributes in accordance with one embodiment of the invention.

In some embodiments, a user can direct the electronic device to provide text or other content using one of several default or pre-defined display attributes. For example, a user can select from one of three default text sizes for user interfaces displayed by the device (e.g., small, medium and large). FIG. 3 is a schematic view of the illustrative device display of FIG. 2 in which text is displayed using different display attributes in accordance with one embodiment of the invention. Display 300 can include title bar 310 and listings 320, which can include some or all of the features of corresponding elements in display 200 (FIG. 2). In contrast with the text provided in display 200, however, the text of title bar 310 and listings 320 can have a larger display size than the corresponding text of display 200 (e.g., a larger font). For example, the text of display 200 can correspond to a small or medium size, while the text of display 300 can correspond to a medium or large size. The particular font sizes for each of displays 200 and 300 can be selected based on any suitable criteria including, for example, the overall size of the display, the size of the display region in which the text is provided, the amount of other text on the interface, the graphics included on the interface, or other industrial design or user interface considerations. In some embodiments, the large font size can be selected so that some or all of the text items displayed in a display region of the device can be provided on a single line.

In some cases, however, a user may wish to see text using a display size that is larger than the large default size. For example, with electronic devices having small displays (e.g., a small square display), users may have difficulty reading text displayed to fit within the display. A user can direct an electronic device to further increase a display size for text by providing a corresponding zoom or size increase instruction using different approaches. For example, a user can select a zoom button. As another example, a user can provide an input on a touch screen corresponding to a zoom instruction (e.g., double tap to zoom on a touch input interface)). As still another example, a user can provide a touch instruction using several fingers on a multi-touch input interface (e.g., pinch fingers in an area near text that the user wishes to see displayed larger). In response to receiving an instruction to increase a display size for text, the electronic device can identify a current display size for the text, and display the text using a larger display size.

The electronic device can increase the display size of particular text using any suitable approach. In some embodiments, the electronic device can zoom the entire displayed interface such that only a portion of the initial interface is visible on the device display at a particular time. Using this approach, the display can give the user the impression of looking at the initial display with a magnifying glass, where the region magnified takes up the entire display. In some embodiments, the electronic device can instead or in addition increase the display size of content within existing display regions. For example, each of listings 220 can maintain the same size and layout within the device, but the particular text disposed within the listings can increase in size up to a maximum (e.g., until the characters of the text abut top and bottom boundaries of individual listings). When the display size of text reaches a maximum within a display region, the particular display region in which the text is displayed can increase in size without changing the size of some or all of the display regions (e.g., increase the size of some or all of listings 220, but leave the size of title bar 210 the same).

When a user wishes to increase a text size beyond a maximum level, all of the text may not be displayed. In particular, if a display includes several display regions, increasing a display size for text, and thus increasing the size of at least one of the several display regions can take away the display real estate required to display another one of the several display regions, as illustrated in the following figures. Accordingly, the electronic device can identify the content in a particular display region selected by a user for which or around which to increase a display size.

The electronic device can identify the particular display region selected by a user for which to increase a display size using any suitable approach. In some embodiments, a user can provide an instruction to enlarge the display at a particular location on the display. For example, a user can touch a display at a particular location. As another example, a user can select a display region and provide an instruction (e.g., select a region and press a displayed button for increasing a display size of text). As still another example, a user can provide an instruction while a cursor or other pointing interface is overlaid on a display region of the displayed interface. The particular location identified by the device can have any suitable size, including for example a point size (e.g., the point of a cursor), a region defined by several inputs of a user (e.g., a region within a multi-touch input), a region in the vicinity of an input (e.g., a region of a predefined size around an input position), or combinations of these.

In response to identifying the particular location of the user's input on the display, the electronic device can identify the one or more display regions corresponding to the location. For example, the electronic device can identify a particular display region that includes the particular location. As another example, if a particular location is located within several display regions, the electronic device can identify the one of the several display regions that includes the largest portion of the particular location. As still another example, if a particular location is located within several display regions, the electronic device can identify two or more of the several display regions.

Figure 4:
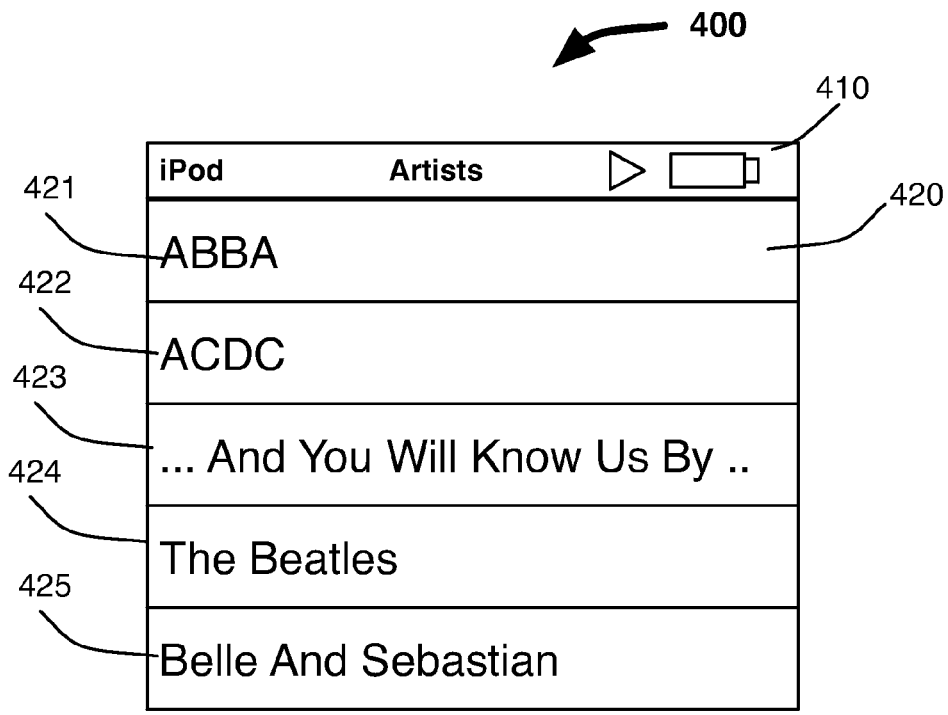
FIG. 4 is a schematic view of an illustrative display prior to receiving an instruction to increase a display size of text in accordance with one embodiment of the invention.

FIG. 4 is a schematic view of an illustrative display prior to receiving an instruction to increase a display size of text in accordance with one embodiment of the invention. Display 400 can include title bar 410 and listings 420 having some or all of the properties of the corresponding components described above in connection with displays 200 and 300 (FIGS. 2 and 3). Title bar 410 can identify the current display as a display for selecting particular artists. Listings 420 can include listing 421 identifying artist "ABBA," listing 422 identifying artist "ACDC," listing 423 identifying artist " . . . And You Will Know Us By The Trail Of Dead," listing 424 identifying artist "The Beatles," and listing 425 identifying artist "Belle and Sebastian." The text provided in listings 420 can be provided using any of the default display sizes, including for example a large display size. A user can provide an instruction to increase the display size of any of the text shown in display 400. For example, a user can provide an instruction in the vicinity of a particular listing 422.

The electronic device can display text or other content using any suitable increased display size in response to receive a corresponding instruction from a user. In some embodiments, the user can select a particular discrete display size, where the granularity between display sizes can be determined from display characteristics (e.g., from the number of pixels within the display). In some cases, the electronic device can instead or in addition define several levels of display size that can be applied to displayed text, such that the text display size can move between the several levels. The electronic device can select any suitable display size to serve as a particular level in a sequence of display sizes at which text is displayed. In some embodiments, the electronic device can determine, from analysis of text currently displayed, analysis of all available text to display, historical text distribution information, or other information regarding text distribution, one or more display sizes that optimize the amount of text displayed in a particular region to serve as levels of display sizes. For example, the electronic device can select display sizes so that the amount of text displayed in a display region corresponds to a paragraph, a sentence, a phrase, a word, a syllable, a character or letter, or any other text collection. In some embodiments, all of the display sizes may not be available for each text region in which the display size of text is increased. For example, text that does not include several paragraphs, or text that constitutes a phrase and not a sentence can be displayed using display sizes that correspond to text collections that are smaller than the currently displayed text.

The display size can, in some cases, be adjusted based on the dimensions of a display region in which the text is provided. For example, a particular display size may be such that a sentence is displayed in its entirety in a large display region, but only a first phrase of the same sentence is displayed in a small display region. To display the sentence in its entirety in the small display region, a smaller display size may be required (e.g., to allow the text to be displayed in a similar number of lines). Accordingly, a particular display size can be selected in concord with the size of the display region that will be provided for the text at the given display size.

The electronic device can increase the size of any suitable portion of a display in response to receiving a corresponding instruction (e.g., any suitable amount of displayed text. In some embodiments, the electronic device can only increase the display size of a particular listing (e.g., the text in a listing in which an input was detected). In some embodiments, the electronic device can instead or in addition increase the display size of text provided in several display regions having the same or similar properties. For example, the electronic device can increase the display size of all of the text provided in listings of the display. In some embodiments, the electronic device can instead or in addition increase the display size of text provided in different types of display regions. For example, the electronic device can change the display size of text provided in listings and in a title bar of a display. The changes to displayed text can be maintained or ignored as a user navigates through several displays. For example, the electronic device can keep the display size of text consistent (e.g., increased) as the user selects particular options in listings and directs the device to provide new displays having different information in the listings. The electronic device can determine whether to maintain a modified display size based on any suitable criteria including, for example, the similarity or shared properties of displayed regions across different displays (e.g., keep increased display size when a user selects an artist name to display the albums or songs by the selected artist).

Figure 5:
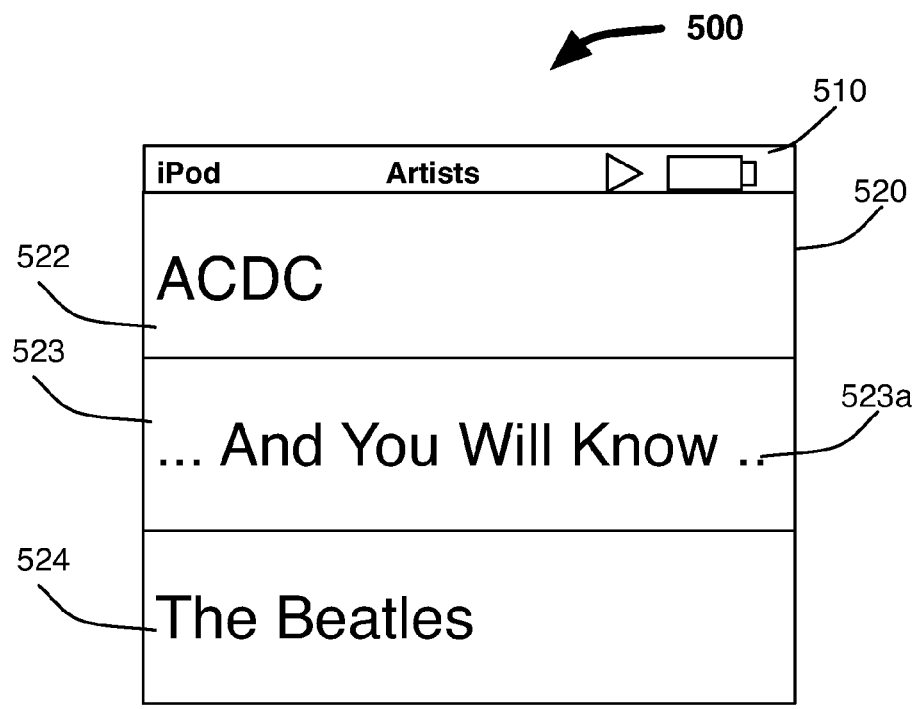
FIG. 5 is a schematic view of an illustrative display for which the display size of content is increased to a second display size in accordance with one embodiment of the invention.

FIG. 5 is a schematic view of an illustrative display for which the display size of content is increased to a second display size in accordance with one embodiment of the invention. Display 500 can include text box 510 and listings 520, which can have some or all of the attributes of the corresponding elements of display 400 (FIG. 4). In display 500, the size of text in title bar 510 may remain the same relative to the title bar of display 400, but the number of listings provided in listings 520, as well as the display size of text within the listings can be different. In particular, display 500 can include only listings 522, 523 and 524, which can correspond to listings 422, 423 and 424 (FIG. 4). Although the width of listings 520 may be the same as the width of listings 420, the height of listings 520 may be larger than the height of listings 420, which can enable the display size of the text displayed in listings 520 to be larger than that of the text in listings 420.

The electronic device can select any suitable change in display size for text provided in listings 520 relative to the same text provided in listings 420. In some embodiments, the display size for listings 520 can be selected based on a desired text collection to display within each listing (e.g., a desired subset of text to display). For example, the display size selected for listings 520 can be selected so that complete phrases are displayed in the listings. In particular, the phrase "And You Will Know" is displayed in listing 523. Listing 523 can include ellipsis 523a to indicate to a user that additional text is not shown in the listing. The electronic device can pan or scroll the text using different approaches including, for example, in response to a user instruction or automatically.

The electronic device can increase the display size of any of the particular listings of display 400 to provide display 500. For example, the electronic device can identify a particular listing on or near which an instruction to increase a text size was received, and display the particular listing and surrounding listings (e.g., an instruction was provided near the listing corresponding to "And You Will Know" or near the listing corresponding to "The Beatles"). When increasing the display size, the electronic device can display any suitable portion of the text in a listing. For example, the electronic device can display the particular text in the display region that was in the vicinity of the detected instruction (e.g., provide a zoom-like operation). Alternatively, the electronic device can automatically display the beginning or start of the text in a display region even if the portion of the text at which the instruction was provided would not be displayed when the display size is increased and text is displayed in the vicinity of the detected instruction. This approach may be desirable, for example, when a user cannot discern the characters in displayed text, as it allows a user to read the text from the beginning.

Figure 6:
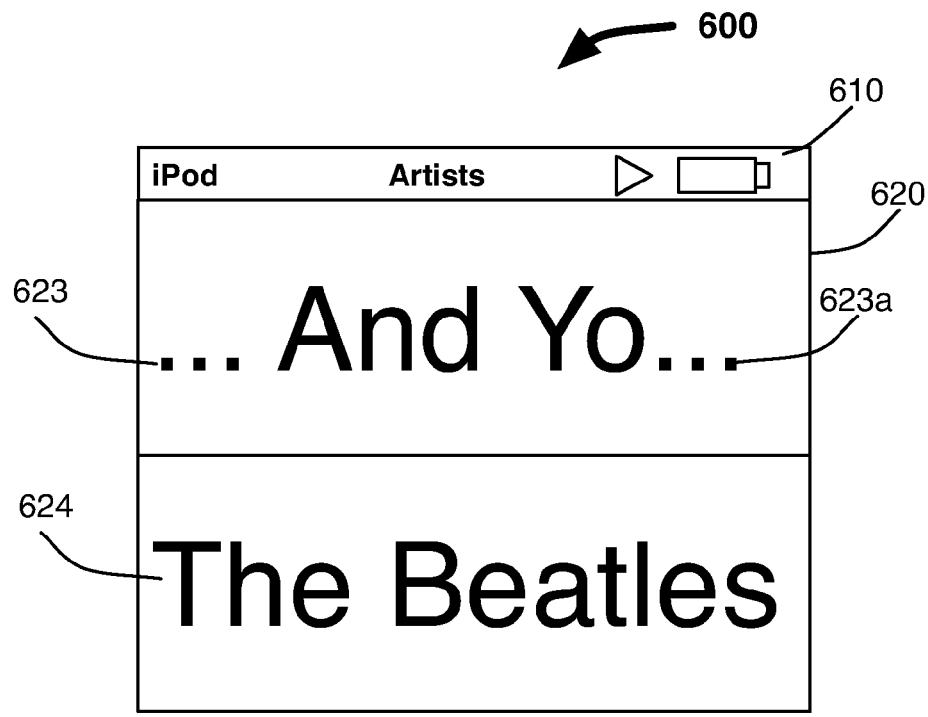
FIG. 6 is a schematic view of an illustrative display for which the display size of content is increased to a third display size in accordance with one embodiment of the invention.

FIG. 6 is a schematic view of an illustrative display for which the display size of content is increased to a third display size in accordance with one embodiment of the invention. Display 600 can include text box 610 and listings 620, which can have some or all of the attributes of the corresponding elements of display 400 (FIG. 4). In display 600, the size of text in title bar 610 may remain the same relative to the title bar of display 400, but the number of listings provided in listings 620, as well as the display size of text within the listings can be different, and can in addition differ with respect to the listings of display 500 (FIG. 5). In particular, display 600 can include only listings 623 and 624, which can correspond to listings 523 and 524 (FIG. 5). Although the width of listings 620 may be the same as the width of listings 420, the height of listings 620 may be larger than the height of listings 420 (and of listings 520, FIG. 5), which can enable the display size of the text displayed in listings 620 to be larger than that of the text in listings 420 and 520.

The electronic device can select any suitable change in display size for text provided in listings 620 relative to the same text provided in listings 520. In some embodiments, the display size for listings 620 can be selected based on a desired text collection to display within each listing (e.g., a desired subset of text to display). For example, the display size selected for listings 620 can be selected so that the entirety of a shorter text string is displayed in the listing. In particular, the text "The Beatles" is displayed in listing 624 such that the display size of the text is the a large display size for displaying the entirety of the text in the display region of the listing. Listing 624 can include a text collection in which a word is not displayed in its entirety, but for which ellipsis 624a indicates that additional text is not displayed. The electronic device can pan or scroll the text using different approaches including, for example, in response to a user instruction or automatically.

Figure 7:
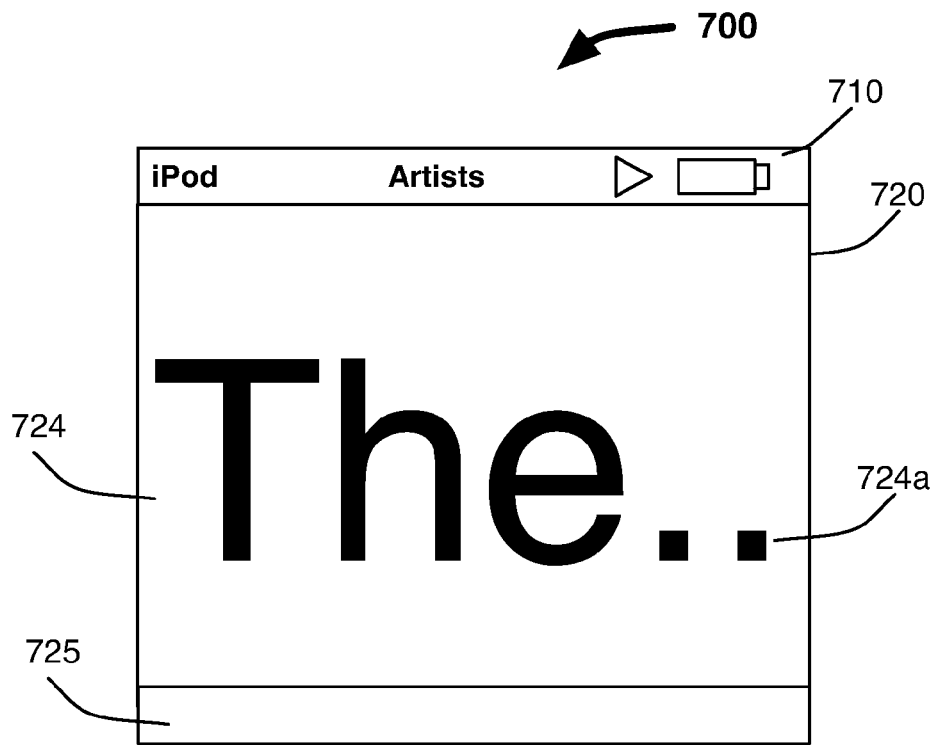
FIG. 7 is a schematic view of an illustrative display for which the display size of content is increased to a fourth display size in accordance with one embodiment of the invention.

FIG. 7 is a schematic view of an illustrative display for which the display size of content is increased to a fourth display size in accordance with one embodiment of the invention. Display 700 can include text box 710 and listings 720, which can have some or all of the attributes of the corresponding elements of display 400 (FIG. 4). In display 700, the size of text in title bar 710 may remain the same relative to the title bar of display 400, but the number of listings provided in listings 720, as well as the display size of text within the listings can be different, and can in addition differ with respect to the listings of display 400 and of display 600 (FIG. 6). In particular, display 700 can include listing 724, which can correspond to listing 624 (FIG. 6), and partial listing 725 in which no text may be visible. To see the content of listing 725, a user may be required to scroll down the displayed listings. Although the width of listings 720 may be the same as the width of listings 620, the height of listings 720 may be larger than the height of listings 620, which can enable the display size of the text displayed in listings 720 to be larger than that of the text in listings 420, 520 and 620.

The electronic device can select any suitable change in display size for text provided in listings 720 relative to the same text provided in listings 620. In some embodiments, the display size for listings 720 can be selected based on a desired text collection to display within each listing (e.g., a desired subset of text to display). For example, the display size selected for listings 720 can be selected so that an entire word is displayed in the listing. In particular, the text "The" from "The Beatles" is displayed in listing 724 such that the display size of the text is the a large display size for displaying the entirety of the word in the display region of the listing. Listing 724 can include ellipsis 724a indicating that additional text from the listing is not displayed. The electronic device can pan or scroll the text using different approaches including, for example, in response to a user instruction or automatically. The text provided in listing 724 can correspond to the first word of a listing, so that a user can begin to read the text of the listing from the beginning.

Figure 8:
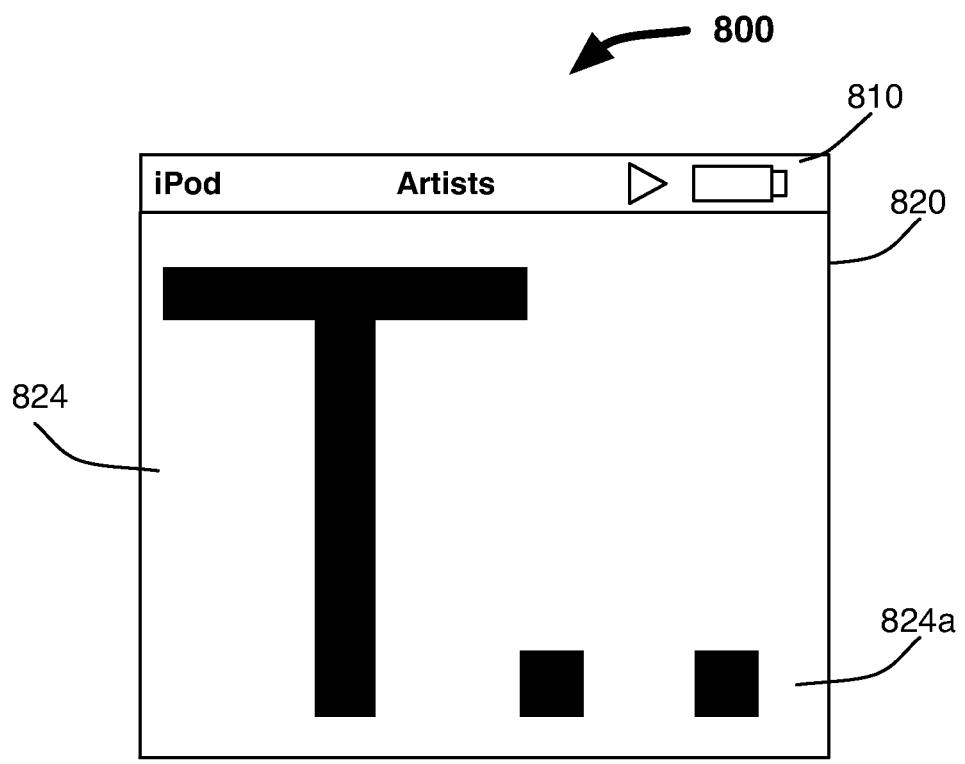
FIG. 8 is a schematic view of an illustrative display for which the display size of content is increased to a fifth display size in accordance with one embodiment of the invention.

FIG. 8 is a schematic view of an illustrative display for which the display size of content is increased to a fifth display size in accordance with one embodiment of the invention. Display 800 can include text box 810 and listings 820, which can have some or all of the attributes of the corresponding elements of display 400 (FIG. 4). In display 800, the size of text in title bar 810 may remain the same relative to the title bar of display 400, but the display size of text within the listings (as well as, in some instances, the number of listings) can differ with respect to the listings of display 400 and of display 700 (FIG. 7). In particular, display 800 can include only listing 824, which can correspond to listing 724 (FIG. 7). Although the width of listings 820 may be the same as the width of listings 720, the height of listings 820 may be larger than the height of listings 720, which can enable the display size of the text displayed in listings 820 to be larger than that of the text in listings 420, 520, 620 and 720.

The electronic device can select any suitable change in display size for text provided in listings 820 relative to the same text provided in listings 720. In some embodiments, the display size for listings 820 can be selected based on a desired text collection to display within each listing (e.g., a desired subset of text to display). For example, the display size selected for listings 820 can be selected so that only one or more letters (typically less than an entire word) are displayed in the listing. In particular, the letter "T" from "The Beatles" is displayed in listing 824 such that the display size of the text is the a large display size for displaying the entirety of the word in the display region of the listing. Listing 824 can include ellipsis 824a indicating that additional text from the listing (e.g., the remaining letters of the word) is not displayed. In some embodiments, the electronic device can provide different forms of ellipsis or other symbols to indicate that additional characters corresponding to a partially displayed word, partially displayed phrase, partially displayed sentence, or partially displayed paragraph are available. For example, three periods can be used to indicate that at least one additional word is not displayed, while two periods can be used to indicate that additional characters of a current word are not displayed. The electronic device can pan or scroll the text using different approaches including, for example, in response to a user instruction or automatically.

In some embodiments, a user may wish to increase the size of displayed text beyond a maximum level (e.g., a level corresponding to display 800). The maximum level can include, for example, the largest display size for displaying a single character, a display size at which reading text on the display becomes too time-consuming or involved (e.g., requiring a user to scroll through individual letters or small groups of letters), or combinations of these. In response to detecting a further instruction to increase a display size, the electronic device can instead or in addition provide content to a user using a different approach. In some embodiments, the electronic device can enable a mode by which a user interface is provided as audio to a user (e.g., an accessibility mode). The audio user interface can enable a user to identify particular options of interest, and to provide corresponding instructions to the device. The electronic device can display text using any suitable display size when an audio output is enabled. For example, the electronic device can display the text using the last display size provided prior to enabling audio outputs. As another example, the electronic device can display the text using a default display size when an audio output is provided In some embodiments, a user can enable an audio user interface) in addition to changing the display size of text provided by the device. In such cases, an audio output of the audio input interface can assist a user in verifying his understanding of displayed content (e.g., the user scans a few letters and guesses the meaning of a displayed option, and uses the audio output to confirm his understanding of the option). The audio output can be selectively enabled, such that the user can request an audio output only for the particular displayed content that the user has difficulty reading or distinguishing on the display.

Figure 9:
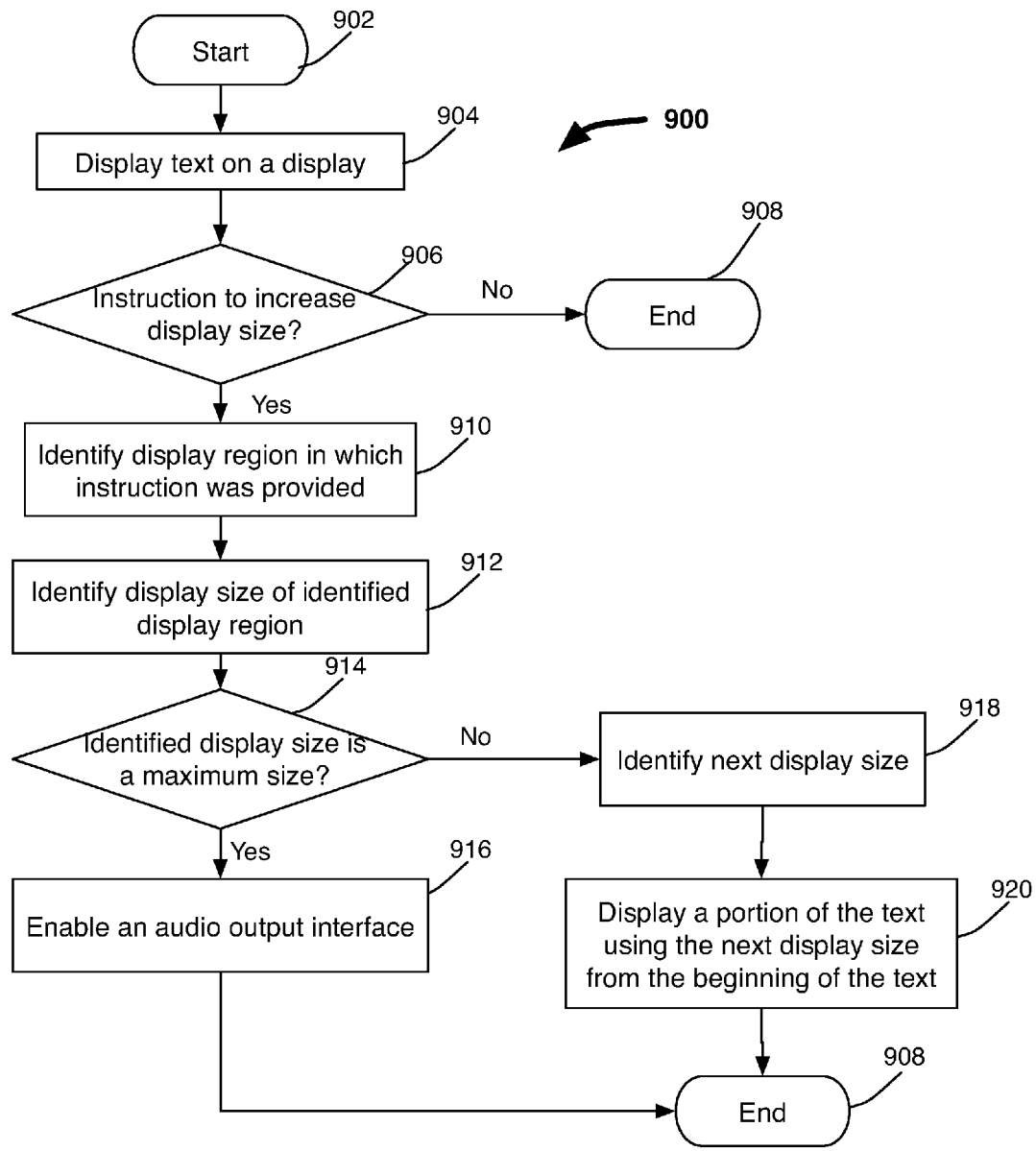
FIG. 9 is a flowchart of an illustrative process for adjusting the display size of text in accordance with one embodiment of the invention.

FIG. 9 is a flowchart of an illustrative process for adjusting the display size of text in accordance with one embodiment of the invention. Process 900 can begin at step 902. At step 904, an electronic device can display text on a display. For example, an electronic device can retrieve content to display and distribute the content within a user interface. The user interface can include several display regions in which content can be provided including, for example, a display region for listings. At step 906, the electronic device can determine whether an instruction to increase the display size of text was received. For example, the electronic device can determine whether a touch gesture corresponding to zooming or increasing the display size of text was received (e.g., a pinch or double tap gesture). If the electronic device determines that no instruction for increasing a display size was received, process 900 can move to step 908 and end.

If, at step 906, the electronic device instead determines that an instruction to increase a display size for text was received, process 900 can move to step 910. At step 910, the electronic device can identify a display region in which the instruction was provided. For example, the electronic device can identify a particular display region in which or near which a touch input was provided. As another example, the electronic device can identify a particular display region in which or near which a cursor was placed when an instruction was received. At step 912, the electronic device can identify a display size for text provided in the identified display region. In particular, the electronic device can identify the current display size for text of the display region. The current display size can, in some embodiments, be a size corresponding to a level in a sequence of display sizes used to display text to a user. At step 914, the electronic device can determine whether the identified display size is a maximum size. For example, the electronic device can determine whether the identified display size corresponds to the largest display size in the sequence of display sizes. As another example, the electronic device can determine whether the display size corresponds to the largest size available to display a particular amount of text (e.g., a letter or a word) in the display region or on the device display. If the electronic device determines that the identified display size is a maximum size, process 914 can move to step 916. At step 916, the electronic device can enable an audio output interface for the electronic device. For example, the electronic device can provide an audio output corresponding to the content provided on the device display. The audio output can include, for example, audio renditions of displayed options (e.g., of text displayed in a display region), and enable a user to provide selections or instructions to the device. Process 900 can then end at step 908.

If, at step 914, the electronic device instead determines that the identified size is not a maximum size, process 900 can move to step 918. At step 918, the electronic device can identify the next display size. For example, the electronic device can identify the next display size in the sequence of display sizes. As another example, the electronic device can identify a particular display size corresponding to the received instruction (e.g., based on the amount by which a user pinched his fingers). In some embodiments, the electronic device can instead or in addition change the size of the display region to enable the display size to increase. At step 920, the electronic device can display a portion of the text provided in the display region using the identified next display region. For example, the electronic device can re-render the text using the new display size, and display the text in the display region. The text can be displayed such that at least the first characters of the text are provided in the display region. This approach can ensure that a user can read the text from the beginning, and understand the text. Process 900 can then end at step 908.

Figure 10:
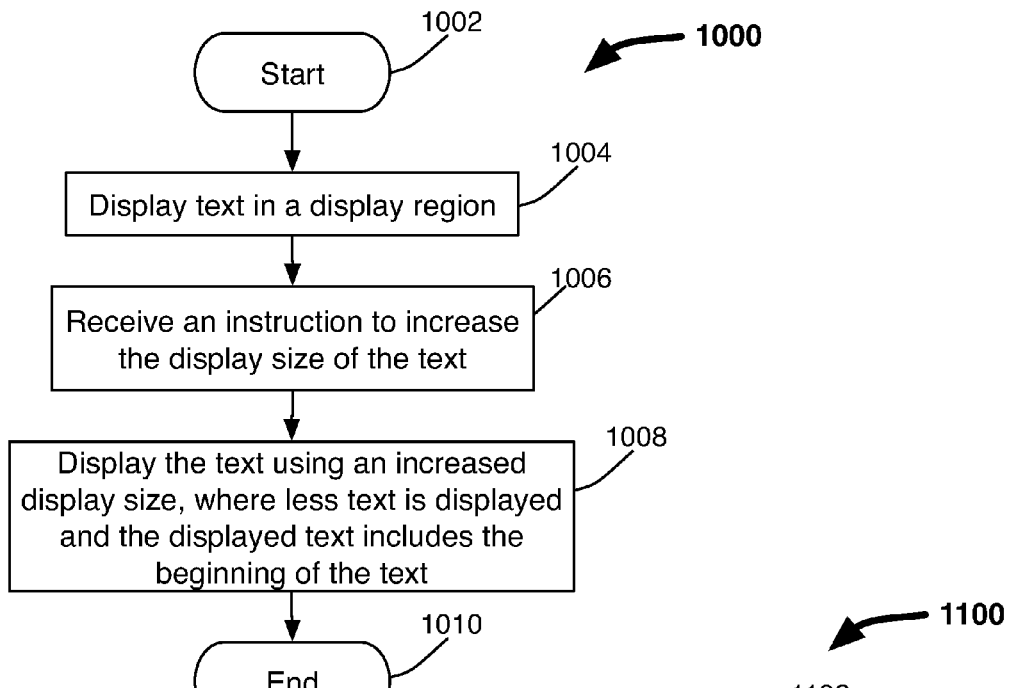
FIG. 10 is a flowchart of an illustrative process for changing the display size of text in accordance with one embodiment of the invention.

FIG. 10 is a flowchart of an illustrative process for changing the display size of text in accordance with one embodiment of the invention. Process 1000 can begin at step 1002. At step 1004, the electronic device can display text in a display region. The text can include a beginning and an end, where the beginning of the text can be on a first side of the display region (e.g., a left side) and the end of the text can be on a second side of the display region (e.g., a right side). At step 1006, the electronic device can receive an instruction to increase the display size of the text. For example, the electronic device can receive a zoom instruction. The instruction can be provided by an input detected within the display region. In some cases, the location of the detected input within the display region can be such that displaying the text adjacent to the location of the detected input using an increased display size may cause the beginning of the text not to be displayed. At step 1008, the electronic device can display the text in the display region using an increased display size such that less of the text is displayed in the display region, and the portion of the text that is displayed includes the beginning of the text. In some embodiments, the electronic device can first identify the beginning of the text. Process 1000 can end at step 1010.

Figure 11:
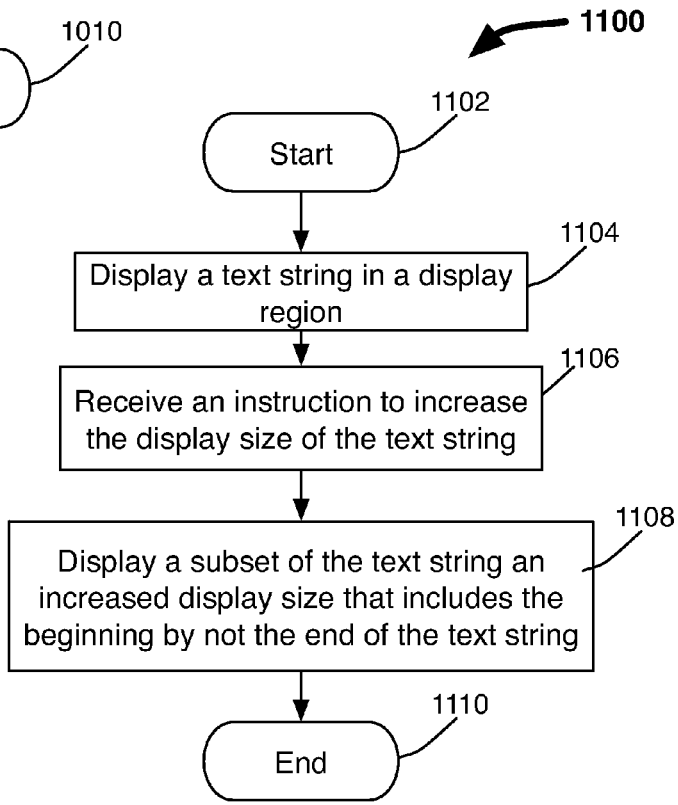
FIG. 11 is a flowchart of an illustrative process for changing the display size of a text string provided on a display in accordance with one embodiment of the invention.

FIG. 11 is a flowchart of an illustrative process for changing the display size of a text string provided on a display in accordance with one embodiment of the invention. Process 1100 can begin at step 1102. At step 1104, the electronic device can display a text string that has a beginning and an end. The text string can include, for example, a paragraph, a sentence, a phrase, a syllable, or several characters. At step 1106, the electronic device can receive an instruction to increase the display size of the text string. The instruction can be detected in a region near the end of the text string. At step 1108, the electronic device can display a subset of the text string using an increased display size such that the subset of the text string includes the beginning of the text string but not the end of the text string. Process 1100 can then end at step 1110.

Figure 12:
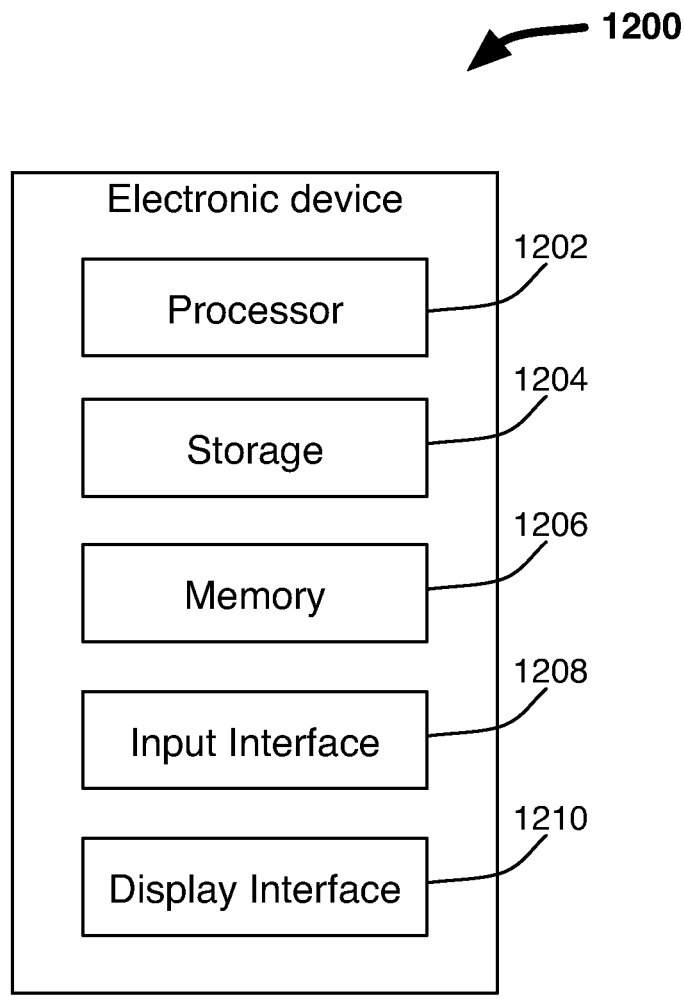
FIG. 12 is a schematic view of an electronic device in accordance with one embodiment of the invention.

Any suitable electronic device can be used to provide some or all of the features described in connection with embodiments of this invention. For example, the electronic device can include cellular telephone, a messaging device, a gaming console, a personal media player, a desktop or notebook computer, a slate, tablet, or pad computing device, a medical device, exercise equipment, or any other electronic device. FIG. 12 is a schematic view of an electronic device in accordance with one embodiment of the invention. Electronic device 1200 may include processor 1202, storage 1204, memory 1206, input interface 1208, and display interface 1210. In some embodiments, one or more of electronic device components 1200 may be combined or omitted (e.g., combine storage 1204 and memory 1206, or omit input interface 1208). In some embodiments, electronic device 1200 may include other components not combined or included in those shown in FIG. 12 (e.g., a power supply, a bus, communications circuitry, or other input or outer interfaces), or several instances of the components shown in FIG. 12. For the sake of simplicity, only one of each of the components is shown in FIG. 12.

Processor 1202 may include any processing or control circuitry operative to control the operations and performance of electronic device 1200. For example, processor 1202 may be used to run operating system applications, firmware applications, media playback applications, media editing applications, or any other application. In some embodiments, a processor may drive a display and process inputs received from a user interface.

Storage 1204 may include, for example, one or more storage mediums including a hard-drive, solid state drive, flash memory, permanent memory such as ROM, any other suitable type of storage component, or any combination thereof. Storage 1204 may store, for example, media data, application data, firmware, user preference information, and any other suitable information or any combination thereof. Memory 1206 can include cache memory, semi-permanent memory such as RAM, and/or one or more different types of memory used for temporarily storing data. In some embodiments, memory 1206 can also be used for storing data used to operate electronic device applications, or any other type of data that may be stored in storage 1204. In some embodiments, memory 1206 and storage 1204 may be combined as a single storage medium.

Input interface 1208 may provide inputs to input/output circuitry of the electronic device. Input interface 1208 may include any suitable input interface, such as for example, a button, keypad, dial, a click wheel, or a touch screen. In some embodiments, electronic device 1200 may include a capacitive sensing mechanism, or a multi-touch capacitive sensing mechanism.

Display interface 1210 can be operatively coupled to processor 1202 for providing visual outputs to a user. Display interface 1210 can include any suitable type of display including, for example, a liquid crystal display (LCD) (e.g., active matrix, passive matrix and the like), a monochrome display, color graphics adapter (CGA) display, enhanced graphics adapter (EGA) display, variable-graphics-array (VGA) display, super VGA display, cathode ray tube (CRT), a plasma display, a display implemented with electronic inks, or any other suitable display. Display interface 1210 can be configured to display a graphical user interface that can provide an easy to use interface between a user of the computer system and the operating system or application running on the system.

In some embodiments, electronic device 1200 may include a bus operative to provide a data transfer path for transferring data to, from, or between control processor 1202, storage 1204, memory 1206, input interface 1208, and display interface 1210, and any other component included in the electronic device.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method comprising:
   displaying text in a display region using an initial display size;
   detecting a selection of a desired text collection;
   receiving an instruction to increase a display size of the desired text collection, wherein the instruction is provided by an input detected within the display region;
   determining a sequence of display sizes based on the desired text collection;
   detecting a selection of an increased display size larger than the initial display size from the sequence of display sizes; and
   displaying the desired text collection in the display region using the increased display size.

2. The method of claim 1, wherein:
   determining the sequence of display sizes is based on an initial size of the display region.

3. The method of claim 1, wherein the desired text collection comprises at least one of:
   a paragraph;
   a sentence;
   a phrase;
   a word;
   a syllable; and
   a letter.

4. The method of claim 1, further comprising:
   increasing a size of the display region to accommodate the text displayed using the increased display size.

5. The method of claim 4, further comprising:
   increasing a height of the display region; and
   keeping constant a width of the display region.

6. The method of claim 1, wherein:
   receiving an instruction further comprises receiving at least one of a touch input detected on the display region and a touch input on a dedicated touch surface.

7. A system comprising one or more processors configured to:
   display text in a display region using an initial display size;
   detect a selection of a desired text collection;
   receive an instruction to increase a display size of the desired text collection, wherein the instruction is provided by an input detected within the display region;
   determine a sequence of display sizes based on the desired text collection;
   detect a selection of an increased display size larger than the initial display size from the sequence of display sizes; and
   display the desired text collection in the display region using the increased display size.

8. A non-transitory machine-readable storage medium comprising instructions that, when executed by one or more processors of a machine, cause the machine to perform operations comprising:
   displaying text in a display region using an initial display size;
   detecting a selection of a desired text collection;
   receiving an instruction to increase a display size of the desired text collection, wherein the instruction is provided by an input detected within the display region;
   determining a sequence of display sizes based on the desired text collection;
   detecting a selection of an increased display size larger than the initial display size from the sequence of display sizes; and
   displaying the desired text collection in the display region using the increased display size.

* * * * *